Dec. 11, 1962  M. C. SÜBERKRÜB  3,068,330
CURRENT COLLECTOR FOR ELECTRIC VEHICLES
Filed Nov. 5, 1959  2 Sheets-Sheet 1

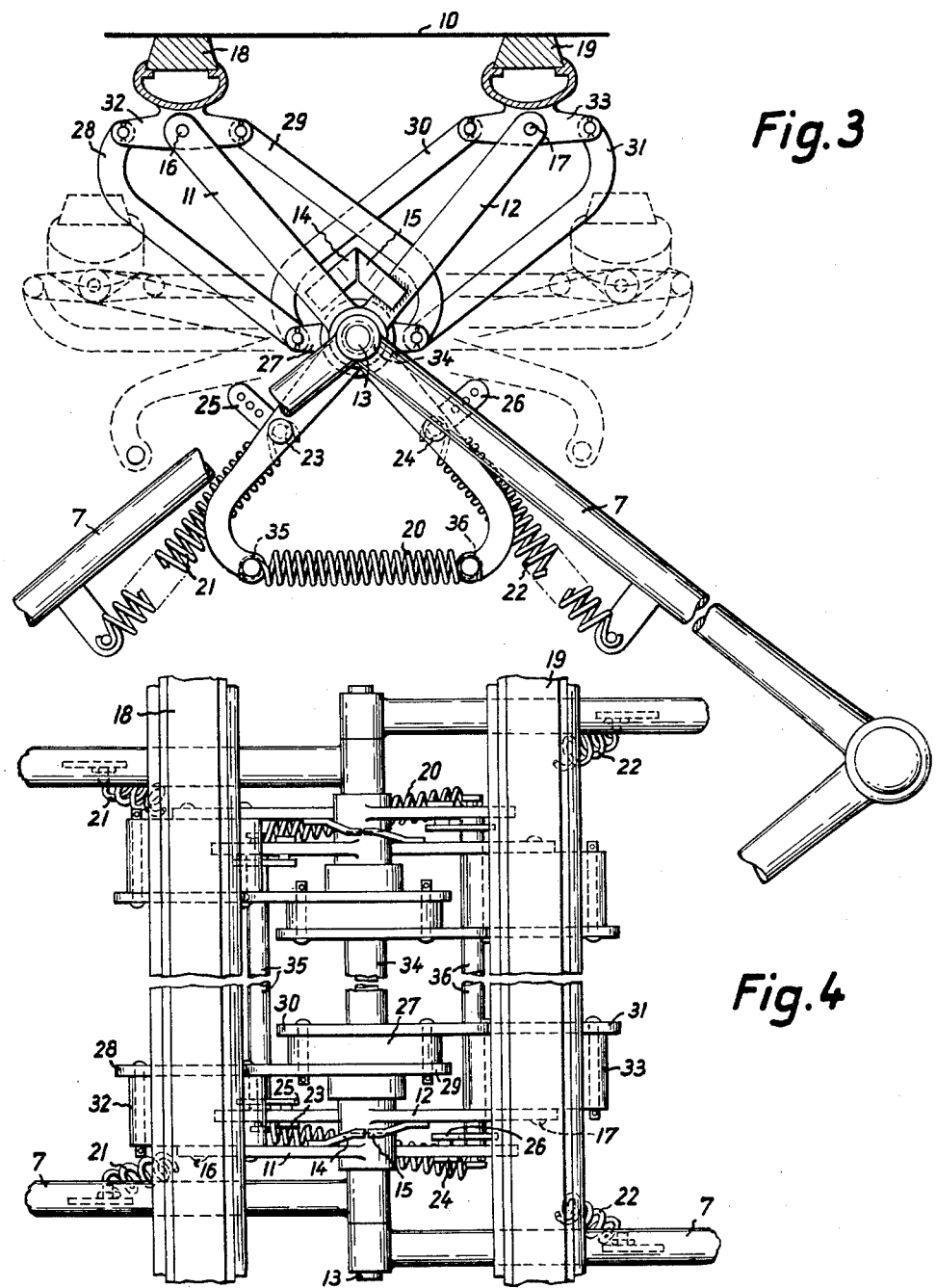

United States Patent Office 3,068,330
Patented Dec. 11, 1962

3,068,330
CURRENT COLLECTOR FOR ELECTRIC VEHICLES
Max Claus Süberkrüb, Frankfurt am Main, Germany, assignor to Licentia Patent-Verwaltungs-G.m.b.H., Frankfurt am Main, Germany
Filed Nov. 5, 1959, Ser. No. 851,146
Claims priority, application Germany Nov. 7, 1958
4 Claims. (Cl. 191—65)

The present invention relates to current collectors for electrically operated vehicles. More in particular, the present invention relates to a collector shoe gear in the current collector system of electrically operated vehicles receiving electric energy from an overhead contact wire.

The current collector of electrically operated vehicles such as, for example, electric locomotives deriving the electric energy from an overhead contact wire usually comprise a pantograph-type structure mounted on top of the vehicle and contacting the overhead wire. It has been found that the known current collectors do not follow vertical level differences of the overhead contact wire with the required speed and accuracy. The reduced mass of the pantograph collector is rather great and, consequently, the available collector bow pressure is sufficient to effect only a comparatively small vertical adjustment, particularly at elevated speeds. In addition, the adjustments to varying positions of a contact wire cannot be effected with the required speed.

It has, therefore, already been proposed to provide the pantograph collector with a twin collector shoe gear consisting of two individual colector shoes mounted on a pair of rocking levers which latter are connected with each other by a spring coupling. In this arrangement each individual collector shoe operates substantially independently, its two-armed rocking lever being permitted to pivot about the common fulcrum of the two rocking levers. Due to the coupling spring connecting the two rocking levers, each movement of one of the collector shoes and its corresponding rocking lever is transmitted to the other collector shoe and its rocking lever. Each rocking lever operates in a range of from 0° to 45° with respect to the horizontal.

The known twin collector shoe gear suffers, however, from the disadvtantage that the two shoe gears have an unstable position with respect to the common pivot of their rocking levers. As a consequence, the twin collector shoe gear toggles on one of the two sides of the pantograph whenever the collector is removed from the overhead contact wire. Even the relative wind produced at elevated speeds of the vehicle may cause the collector shoe gear to become unbalanced, so as to assume an oblique position. This, in turn, results in different collector bow pressures of the first and the second collector shoe, respectively.

It is the object of the present invention to provide a twin collector shoe gear for current collectors of electrically operated vehicles obtaining electric energy from an overhead contact wire, which has a stable position relative to the common pivot of the rocking levers even if removed from the contact wire and even at elevated speeds.

It is another object of the present invention to provide a twin collector shoe gear for current collectors of electrically operated vehicles obtaining electric energy from an overhead contact wire, wherein each one of the two collector shoes exercises under substantially all operating conditions the same pressure against the contact wire as the other one of the two collector shoes.

It is a further object of the present invention to provide a twin collector shoe gear for current collectors of electrically operated vehicles obtaining electric energy from an overhead contact wire, which is capable of following up very speedily and accurately vertical level differences of the contact wire over a considerable distance.

These objects are achieved by the twin collector shoe gear of the present invention comprising a pair of collector shoes mounted on a pair of rocking levers connected with each other by a spring coupling, and further provided with a pair of tilting springs actuating the rocking levers. The tilting springs are so positioned that their respective longitudinal axes are substantially parallel to the longitudinal axes of the rocking levers in the highest position of the collector shoes. The rocking levers are pivotally mounted either on the upper bolt of the collector pantograph or on the bolt of a rocking lever associated with the pantograph.

The rocking levers can be provided with stop members mounted above the pivot of the rocking levers and limiting the upward stroke of the collector shoes in such a manner that between the highest and the lowest position of the collector shoes the rocking levers form an angle with the horizontal in the range from 0° to 45°.

Furthermore, the twin collector shoe gear can be equipped with bracing means reinforcing the same transversely relative to the direction of movement of the vehicle. The bracing means can consist of tubes disposed between the left-hand and the right-hand pivot of the rocking levers and between the lowermost portions of the two-armed rocking levers.

It is also of advantage to equip the twin collector shoe gear with means for compensating the relative wind produced at high speeds of the vehicle acting upon the collector shoes.

The invention will be better appreciated upon the following description of the accompanying drawings, wherein FIGURE 1 is a side elevational view of the known twin collector shoe gear associated with a pantograph-type collector;

FIGURE 3 is a side elevational view of the twin collector shoe gear of the present invention;

FIG. 4 is a top view of the twin collector gear shoe shown in FIG. 3;

Figure 1:
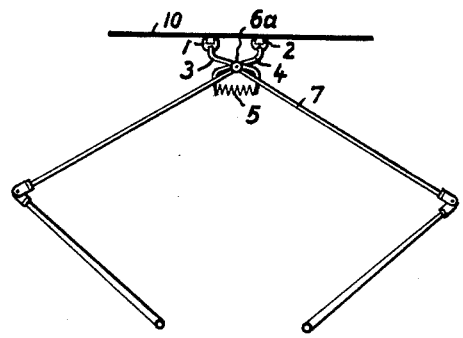
Figure 2:
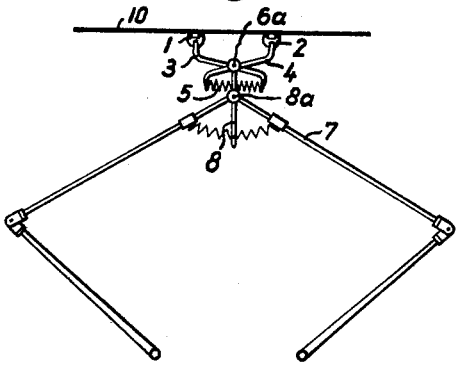
FIGURE 2 is a side elevational view of a modification of the known twin collector shoe gear where the pantograph is provided with a special rocking lever.
Figure 5:
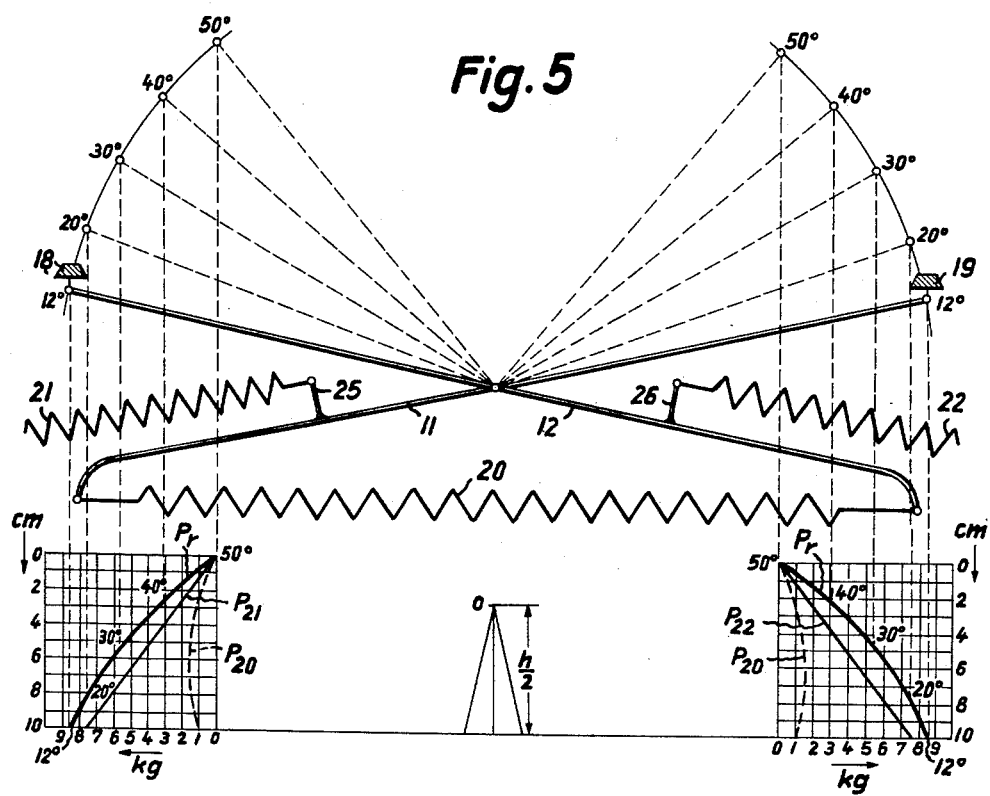
FIGURE 5 is a diagram illustrating the forces prevailing in various operational positions of the twin collector shoe gear of the invention.

Referring now to the drawings more in detail and turning first to FIGURES 1 and 2, the aforementioned known collector system comprises a pantograph collector 7 having an upper bolt 6a and a twin collector shoe consisting of two collector members 1, 2, each mounted on separate pivotable levers 3, 4, and connected with each other by means of a spring coupling 5. The resilient coupling 5 permits the two collector members 1 and 2 to be displaced relative to each other. The two levers 3, 4, can be pivotally mounted on the upper bolt 6a of pantograph 7. The overhead contact wire is designated with reference numeral 10.

It is, however, also possible to provide a rocking lever 8 pivoted at its mid-point as at 8a at the uppermost end of pantograph 7 and fulcrumed as at 6a on the bolt on which the levers 3 and 4 are pivotally mounted. This latter arrangement is shown in FIGURE 2.

According to the collector shoe gear of the present invention shown in FIGURE 3 there is again provided a pair of two-armed pivotable levers 11 and 12 having their common pivot point on a common shaft 13. The shaft 13 is mounted either on the upper pivot 6a of a known pantograph 7 or at the upper pivot 6a of the rocking lever 8 of a pantograph 7 as shown, for example, in FIGURE 2. The pivotable levers 11 and 12 have stop members 14 and 15 mounted above shaft 13. At the respective upper ends the two-armed pivotable levers 11 and 12 have pivots 16 and 17 for the collector shoes 18 and 19. The respective lower ends of the pivotable levers 11 and 12 are connected with each other by a coupling spring 20. In addition, each of the pivotable levers 11 and 12 is in connection with tilting springs 21 and 22. The respective upper ends of these springs have an eye portion with which they can be connected with the bolts 23 and 24 or with one of the several circular openings in the attached flanges 25 and 26 projecting from the lower arms of levers 11 and 12. The respective lower ends of the springs 21 and 22 are connected with the upper arms of a pantograph such as a pantograph 7 shown in FIGURES 1 and 2. The tilting springs 21 and 22 are positioned parallel to the central axes of the lower arms of levers 11 and 12. However, they can be placed in a position slightly deviating from the position parallel to the axes of levers 11 and 12, by connecting the respective upper ends of the springs with their eye portions to the bolts 23 and 24 or to one of the several openings in flanges 25 and 26.

Furthermore, the tube 34 is provided between the left and the right pivot 13 of levers 11 and 12. This tube 34 prevents a displacement of the levers relative to one another.

It is also of advantage to provide means of compensating the influence of the relative wind produced during the movement of the vehicle on the collector shoes 18 and 19. These can consist of tubes 35 and 36 disposed between the lower ends 11 and 12.

The collector shoes 18 and 19 are connected with bridge portion 27 via rocking bridges 32 and 33 by the rods 28 and 29, as well as 30 and 31, forming a parallelogram structure. This arrangement maintains the horizontal position of the collector shoes 18 and 19.

Due to the afore-mentioned arrangement the twin collector shoe gear of the present invention has a stable position; this stable position is maintained even in the inoperative position of the current collector, removed from contact with the overhead wire.

In addition, each of the two collector shoes 18 and 19 receive an increasing spring load during the downward movement of the collector bow, whereas they receive a diminishing spring load whenever the collector bow moves upwardly. Consequently, the pressure of the collector shoe gear against the overhead contact wire increases whenever the collector bow moves downwardly following, e.g. a sag of the contact wire. Shocks produced by sudden level differences of the overhead contact wire are thus resiliently absorbed by the collector shoe gear of the invention. The capacity of coupling spring 20 is preferably so chosen that the collector shoes 18 and 19 are in an intermediate operational position at the normal station pressure of the collector bow; each of the collector shoes then can follow-up sudden level differences of the overhead contact wire. For that reason the contact between collector shoe and contact wire is not interrupted even where section insulators of comparatively great masses are provided in the contact wire system.

The collector shoes of the collector shoe gear shown in FIGURES 1 and 2 operate substantially independently so that a simultaneous and constant contact of both collector shoes and the overhead wire is not assured. The twin collector shoe gear of the present invention has overcome this disadvantage by providing the pair of tilting springs 21 and 22, causing the two levers 11 and 12 to influence each other. Each collector shoe is therefore constantly urged against the contact wire and is safely prevented from rebounding therefrom.

It is a further advantage of the twin collector shoe gear of the invention that both collector shoes are entirely independent from the particular position of shaft 13 relative to the vehicle or the overhead contact wire. The respective masses of the current collector and the collector shoes are thus almost entirely independent from each other.

The operation and the afore-mentioned advantages of the twin collector shoe gear of the invention will become even more apparent by the description of FIGURE 4, showing schematically the structure of the invention and giving a force diagram of the collector system in operation.

In the force diagram in the lower portion of FIGURE 4 $P_{20}$ designates the characteristic curve of coupling spring 20; $P_{21}$ and $P_{22}$ designate the characteristic curves of tilting springs 21 and 22 respectively, and $P_r$ refers to the characteristic curves resulting from the forces exercised by springs 20, 21, and 22. In the center of FIGURE 4 is shown half a stroke of spring 20 as depending on the various spring forces.

As shown in FIGURE 4, the coupling spring 20 as well as the tilting springs 21 and 22 cooperate in producing a total pressure urging the collector shoes against the contact wire. The total of the combined spring forces is equivalent to the pressure of the collector bow against the contact wire.

If it is assumed that, for example, the static collector bow pressure is 6 kilograms for both collector shoes, or 3 kilograms for one collector shoe; the collector shoe has performed a downward stroke of 2 to 3 centimeters, whenever it is urged against the contact wire with the static collector bow pressure. In case of an abrupt and sudden upward movement of the contact wire the collector shoes can therefore easily follow up over a distance of 2 to 3 centimeters.

It is, of course, possible, to provide springs of a different capacity, producing a stroke of greater or smaller lengths. For example, if each collector shoe performs a stroke over a distance of 9 centimeters, the pressure of each collector shoe against the contact wire is in the order of 8 kilograms, the total pressure thus being 16 kilograms. Collector bow pressures in this order can arise at elevated speeds and particularly heavy current collector systems.

It will be understood that this invention is susceptible to modification in order to adapt it to different usages and conditions and, accordingly, it is desired to comprehend such modifications within this invention as may fall within the scope of the appended claims.

What I claim is:

1. In a current collector system for electric vehicles having a pantograph and an upper pivot bolt thereon; a twin collector shoe gear comprising a pair of collector shoes; a pair of pivotable two-armed levers each having an upper arm, a lower arm and a mid-point pivot; means for pivotally mounting said levers with their mid-point pivots on said upper bolt of said pantaograph in substantially symmetrical arrangement; means for pivotally mounting said collector shoes at the upper arm of said levers, respectively, including means for maintaining said shoes above their respective pivots; a pair of mutually engageable stop members respectively on said levers, limiting the upward stroke of said collector shoes; a coupling spring connecting said pivotable levers with each other; and a pair of tilting springs connected with one of their respective ends to said pantograph and with the other of their respective ends to the lower arm of said levers, the longitudinal axes of said tilting springs being substantially parallel with the longitudinal axes of said levers in the highest position of said collector shoes.

2. Twin collector shoe gear in a current collector system as described in claim 1, said pair of stop members limiting the upward stroke of said collector shoes so that said two-armed levers form an angle with the horizontal in the range from 0° to 45° between the highest and the lowest position, respectively, of said collector shoes.

3. In a current collector system for electric vehicles having a pantograph and an upper pivot bolt thereon; a twin collector shoe gear comprising a pair of collector shoes; a pair of pivotable two-armed levers each having an upper arm, a lower arm and a mid-point pivot; means for pivotally mounting said levers with their mid-point pivots on said upper bolt of said pantograph in substantially symmetrical arrangement, a pair of rocking bridges; respectively mounted pivotally at the upper arms of said levers, said shoes being respectively mounted on said rocking bridges above the pivots thereof; a bridge member on said upper pivot bolt of said pantograph; a pair of rods connected to each rocking bridge at opposite sides from the pivot connection thereof to the respective lever, each pair of rods being connected with their other ends to respectively opposite sides of said bridge member; a coupling spring connecting said pivotable levers with each other; and a pair of tilting springs connected with one of their respective ends to said pantograph end with the other of their respective ends to the lower arms of said levers, the longitudinal axes of said tilting springs being substantially parallel with the respective longitudinal axes of said two-armed levers in the highest position of said collector means.

4. Twin collector shoe gear in a current collector system as described in claim 3, further comprising bracing tube means disposed between said respective mid-point pivots of said two-armed levers, preventing displacement of the latter relative to one another.

References Cited in the file of this patent

UNITED STATES PATENTS

| | | |
|---|---|---|
| 511,342 | Love | Dec. 26, 1893 |
| 888,339 | Macloskie | May 19, 1908 |
| 895,864 | Janin | Aug. 11, 1908 |
| 2,512,329 | Heinemann et al. | June 20, 1950 |

FOREIGN PATENTS

| | | |
|---|---|---|
| 205,546 | Austria | Oct. 10, 1959 |
| 1,124,759 | France | July 2, 1956 |
| 1,158,107 | France | Jan. 13, 1958 |
| 1,160,514 | France | Mar. 3, 1958 |
| 355,567 | Great Britain | Aug. 27, 1931 |
| 191,398 | Switzerland | Aug. 16, 1937 |

OTHER REFERENCES

Pfeil: German application 1,058,544, printed June 4, 1959 (Kl. 201 9/01).

Mohring: German application 1,086,271, printed Aug. 4, 1960 (Kl. 201 9/01).